No. 750,737. PATENTED JAN. 26, 1904.
M. Y. WARREN.
RAKE.
APPLICATION FILED JUNE 9, 1903.
NO MODEL.
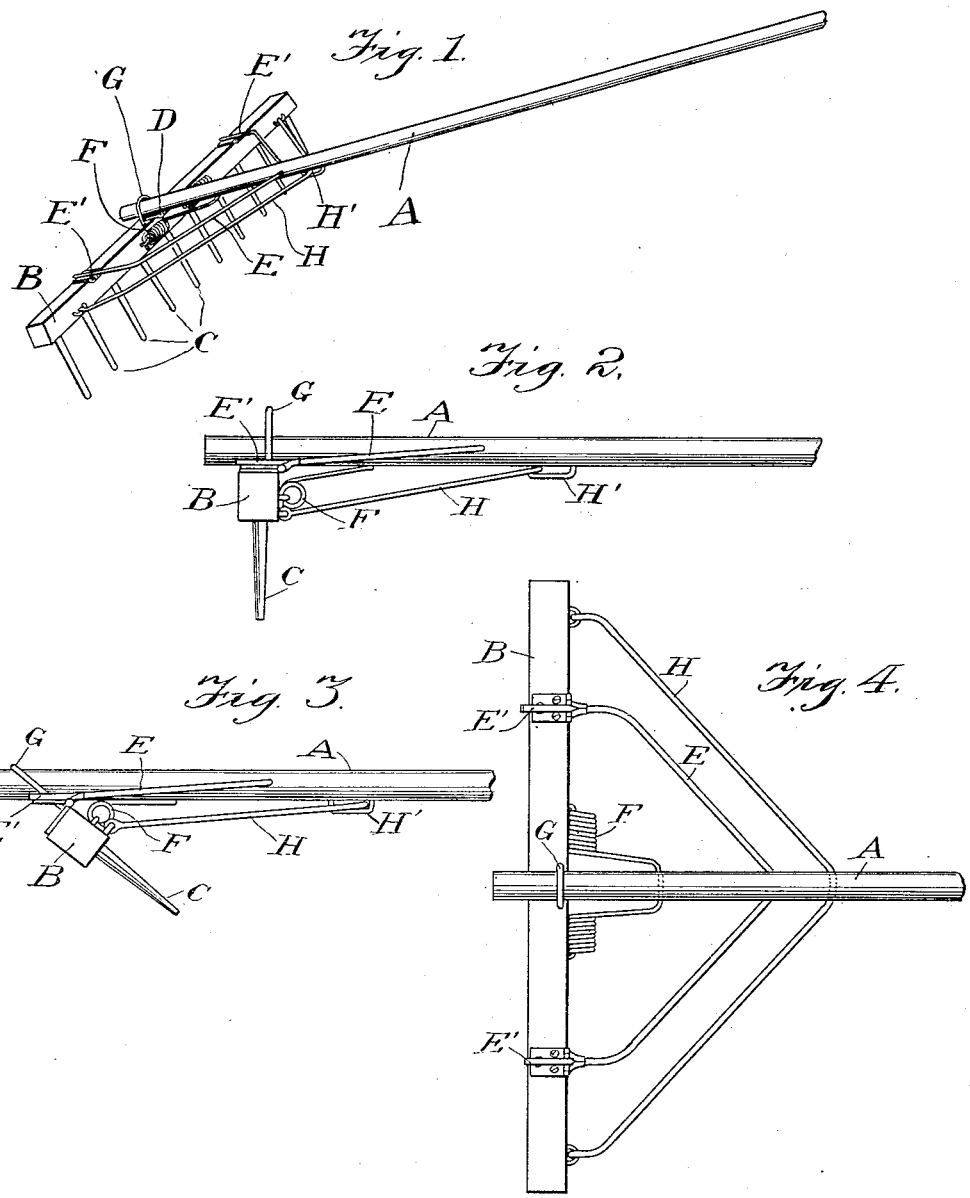
Witnesses:
H. B. Hallick.
L. U. Morrison
Inventor:
Myles Young Warren,
By ........... Attorney No. 750,737. Patented January 26, 1904.

UNITED STATES PATENT OFFICE.

MYLES YOUNG WARREN, OF PHILADELPHIA, PENNSYLVANIA.

RAKE.

SPECIFICATION forming part of Letters Patent No. 750,737, dated January 26, 1904.

Application filed June 9, 1903. Serial No. 160,693. (No model.)

*To all whom it may concern:*

Be it known that I, MYLES YOUNG WARREN, a citizen of the United States, residing at Philadelphia, county of Philadelphia, and State of Pennsylvania, have invented a certain new and useful Improvement in Rakes, of which the following is a specification.

My invention relates to a new and useful improvement in rakes, and has for its object to provide a rake in which the cross-bar carrying the teeth is hinged to the handle in such a manner as to allow the teeth to bend toward the hand for the purpose of cleaning the teeth of the rake.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a perspective view of my improved rake; Fig. 2, a side elevation of the rake in its normal position; Fig. 3, a side elevation of the rake with the teeth bent toward the handle; Fig. 4, a plan view of the rake.

A represents the handle of the rake.

B is the cross-bar, to which the teeth C are secured. The cross-bar B is hinged to the handle of the rake at the point D and is also hinged to the handle by means of the bail E, which passes through the handle at a point forward of the cross-bar, and each end of bail is hinged to the cross-bar at the point E'. A spring F is secured to the cross-bar, and the free end of the spring bears against the under side of the handle, so as to keep the teeth and the cross-bar in their normal position at right angles to the handle. It will thus be seen that the rake when in its normal position can be used as an ordinary rake; but when the teeth of the rake become clogged with leaves, &c., the same can be cleaned by pressing the rake forward, so as to bend the teeth in the position shown in Fig. 3, and coming in contact with the ground the teeth will be cleaned by this forward movement, and as soon as pressure upon the teeth is released and the rake raised the teeth and cross-bar will spring back in their normal position ready for their ordinary use.

For the purpose of strengthening the rake and limiting the movement of the cross-bar and teeth I provide a staple G, the staple being secured in the cross-bar and straddling the end of the handle. This staple is raised sufficiently high above the handle so as to allow the teeth to be bent into their cleaning position; but when the teeth have been bent at the desired angle the staple would come in contact with the upper surface of the handle and limit the movement, and to still further limit the movement of the teeth relative to the handle and to strengthen the rake I provide the bail H, each end of which is secured to a staple in the cross-bar, and the loop of the bail passes through a staple H', secured underneath the handle, and this staple H' is elongated to allow for the movement of the bail therein and limit such movement, as shown in Fig. 3. Either the staple G or the bail H as a means for limiting the movement could be dispensed with, if desired.

The advantage of my improved rake is that I am enabled to provide a rake which may be easily cleaned by pushing the same forward upon the ground, so as to cause the teeth to drag over the ground parallel with the same, and as soon as the pressure is released and the rake raised the teeth will return to their normal position automatically, and I accomplish this without the addition of any complicated mechanism, as is generally used in self-cleaning rakes.

Of course I do not wish to be limited to the exact construction here shown, as slight modifications could be made without departing from the spirit of my invention.

Having thus fully described my invention, what I claim as new and useful is—

1. In a rake, a handle, a cross-bar hinged to the handle so as to allow the same to bend inward toward the handle, teeth secured in the cross-bar, a spring interposed between the cross-bar and handle for returning and holding the cross-bar in its normal position, and a staple secured in the cross-bar and straddling the end of the handle and raised above the handle so as to limit the movement of the cross-bar relative thereto, as and for the purpose specified.

2. In a rake, a handle, a cross-bar hinged to the handle in such a manner as to allow the cross-bar to bend inward toward the handle, teeth secured in the cross-bar, a spring interposed between the cross-bar and handle, a staple secured in the cross-bar and straddling the end of the handle and raised above the handle so as to limit the movement of the cross-bar relative to said handle, a bail, each end of which is pivotally connected to the cross-bar near each of its ends, a staple secured in the handle through which the loop of the bail passes, said staple being elongated so as to allow for the movement of the bail therein but to limit such movement when the cross-bar and teeth have been bent to the desired angle, as specified.

3. In a rake, a handle, a cross-bar hinged to the handle so as to allow for the cross-bar bending toward the handle, a bail, each end of which is hinged to the cross-bar, the loop of the bail being secured to the handle, teeth depending from the cross-bar, a spring interposed between the cross-bar and handle to return and hold the cross-bar in its normal position, and means for limiting the movement of the cross-bar and teeth relative to the handle, as specified.

In testimony whereof I have hereunto affixed my signature in the presence of two subscribing witnesses.

MYLES YOUNG WARREN.

Witnesses:
CHESTER A. ASHER,
ADELAIDE C. THOMAS.